Dec. 13, 1938.  E. LEEBERG  2,140,266
TURF FORK
Filed Dec. 28, 1937
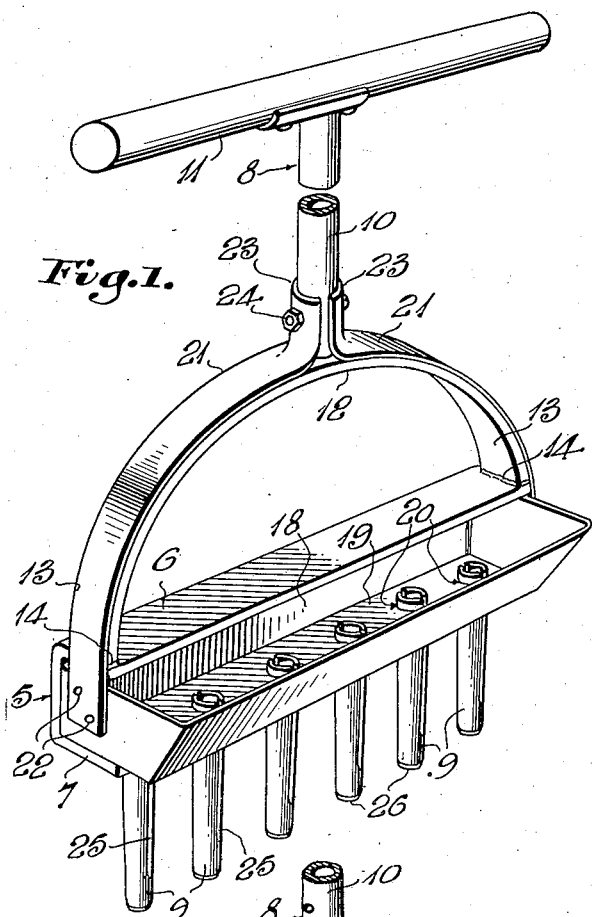
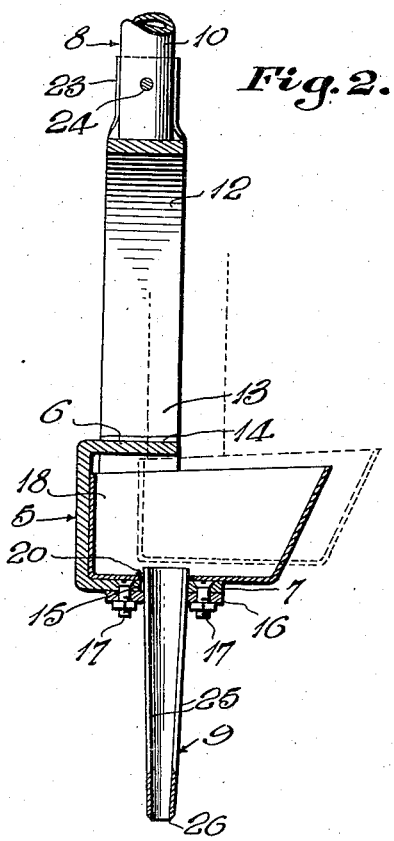
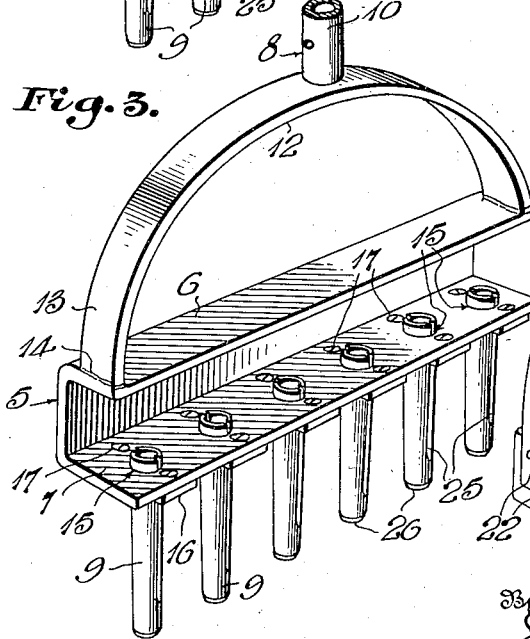
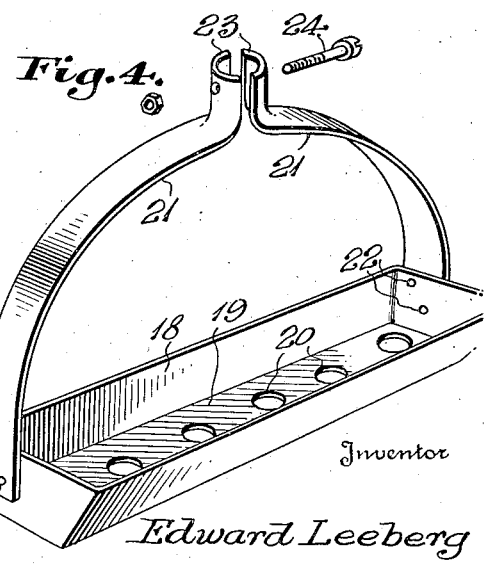
Inventor
Edward Leeberg
By H. B. Wilson & Co.
Attorneys Patented Dec. 13, 1938

2,140,266

UNITED STATES PATENT OFFICE 2,140,266

TURF FORK

Edward Leeberg, Roselle, N. J.

Application December 28, 1937, Serial No. 182,137

8 Claims. (Cl. 55—18)

The invention relates to forks for use in forming openings in turf, allowing the entrance of air, top dressing, fertilizer and water and permitting grass roots to have ample room for expansion and deeper growing, as well as permitting top soil to mingle with stiff hard soil below.

The object of the invention is to provide a new and improved device of the character set forth, of exceptionally simple and inexpensive construction, permitting manufacture at relatively small cost and sale at a reasonable price, the construction, however, being such that the device will be efficient and long-lived, regardless of its simple and inexpensive nature.

With the foregoing in view, the invention resides in the novel subject matter hereinafter described and claimed, description being accomplished by reference to the accompanying drawing.

Fig. 1 is a perspective view partly broken away and in section.

Fig. 2 is a vertical transverse sectional view.

Fig. 3 is a perspective view of the lower portion of the handle, the tine-carrying back bar secured to the lower end thereof, and the tines secured to said back bar.

Fig. 4 is a perspective view of the core receptacle and the attaching means thereof.

A preferred construction has been shown and while this construction will be specifically described, variations may be made within the scope of the invention as claimed.

A short horizontal channel bar 5 is provided, said bar having parallel horizontal flanges 6 and 7 at its upper and lower portions. The lower end of a handle 8 is secured to the upper flange 6, and a plurality of tubular tines 9 are secured to the lower flange 7.

The handle 8 preferably comprises a shank 10 having a cross bar 11 at its upper end and an arched portion 12 at its lower end, the legs 13 of this arched portion being welded at 14 to the ends of the flange 6.

The flange 7 is provided with a plurality of openings 15 spaced apart longitudinally thereof, said openings receiving the upper ends of the tubular tines 9, said upper ends projecting somewhat upwardly from said flange 7 for a purpose to appear. Each tine 9 is provided with an attaching plate 16 welded or otherwise joined thereto, and the various attaching plates are secured to the flange 7 by bolts or the like 17.

A core receptacle 18 is provided to receive the cores of earth which are upwardly discharged from the tubular tines 9 as the latter are repeatedly forced into the earth. This receptacle 18 is partially received between the flanges 6 and 7 of the back bar 5 and its bottom 19 is provided with openings 20 which receive the projecting upper ends of the tines 9, the receptacle being thus held against horizontal movement in any direction. To hold the receptacle against movement in any other direction, I provide it with attaching arms 21 which are secured by rivets or the like 22 to its ends. These arms 21 extend upwardly and inwardly along the outer sides of the legs 13 of the arched handle portion 12, and their inner ends are bent upwardly to provide lugs 23 which are disposed against opposite sides of the shank 10, immediately above the arched portion 12. These lugs are preferably curved transversely to snugly fit against the shank 10 and they are secured to the latter, preferably by means of a single bolt 24.

It is to be observed that the height of the receptacle 18 is slightly less than the distance between the flanges 6 and 7, the difference being such as to permit lifting of said receptacle sufficiently to clear the upper ends of the tines 9 should it be desirable to remove said receptacle, it being of course necessary to remove the bolt or the like 24 before any lifting of the receptacle can take place. The dotted lines in Fig. 2 illustrate the manner of removing the receptacle from the fork, or the manner of applying said receptacle. While it is ordinarily desirable to use the fork with the receptacle attached as seen in Figs. 1 and 2, it may be preferred in other instances to use the fork with the receptacle detached as seen in Fig. 3, and the novel provision above described for attaching the receptacle to the fork, permits easy removal of said receptacle and easy re-application thereof.

Each tine 9 is preferably downwardly tapered both internally and externally, and I prefer to provide opposite sides of said tine with longitudinal slots 25 whose upper ends may well open through the upper extremity of the tine, and whose lower ends are spaced above the cutting edges 26 at the lower end of said tine. These slots permit some yielding of the tines in use and facilitate cleaning and oiling to prevent rust.

The fork is used by repeatedly forcing it into the turf, hand pressure being used on the cross bar 11 and foot pressure upon the upper flange 6 of the back bar 5. As the fork is thus used, the cores cut out of the turf by the tines 9 are discharged from the upper ends of said tines, and these cores are caught in the receptacle 18 when the latter is used, the cores being dumped from the receptacle whenever required. If desired, the receptacle may be provided with a lid or cover.

From the foregoing taken in connection with the accompanying drawing, it will be seen that novel and advantageous provision has been made for carrying out the object of the invention, and while excellent results may be attained from the details disclosed, attention is again invited to the possibility of making variations within the scope of the invention as claimed.

I claim:—

1. A turf fork comprising a horizontal channel bar having upper and lower flanges, said lower flange being provided with longitudinally spaced openings, tubular tines secured to said lower flange in axial alinement with said openings, a core receptacle received partially between said upper and lower flanges and having openings alined with the aforesaid openings, means for securing said receptacle in place, and a handle secured to said channel bar.

2. A turf fork comprising a horizontal channel bar having upper and lower flanges, said lower flange being provided with longitudinally spaced openings, tubular tines secured to said lower flange in axial alinement with said openings, a core receptacle received partially between said upper and lower flanges and having openings alined with the aforesaid openings, a handle having an arched lower end portion, the legs of which are secured to said upper flange, arms secured to the ends of said receptacle and extending along the outer sides of said legs and having upstanding lugs disposed at opposite sides of the portion of the handle adjacent said legs, and means securing said lugs to this handle portion.

3. A turf fork comprising a handle-carried back bar having a horizontal tine-attaching portion, tubular tines having their upper ends secured to and projecting above said tine-attaching portion, a core receptacle having openings in its bottom receiving the upwardly projecting ends of said tines, and means for securing said receptacle with respect to said back bar.

4. A turf fork comprising a handle-carried back bar having a horizontal portion provided with spaced openings, tubular tines secured to said back bar and having their upper ends disposed in and projecting upwardly beyond said openings, a core receptacle having openings in its bottom receiving the upwardly projecting ends of said tines, and means for securing said receptacle with respect to said back bar.

5. A turf fork comprising a back bar having a horizontal tine-attaching portion, tubular tines having their upper ends secured to and projecting upwardly from said tine-attaching portion, a handle secured to and projecting upwardly from said back bar, a core receptacle having openings in its bottom receiving the upwardly projecting ends of said tines, an arm secured to said receptacle and extending upwardly therefrom to a portion of said handle, and means securing said arm to said portion of said handle.

6. A turf fork comprising a horizontal channel bar having upper and lower flanges, said lower flange being provided with longitudinally spaced openings, tubular tines secured to said lower flange and having their upper ends received in and projecting upwardly from said openings, a handle having an arched lower end portion the legs of which are secured to said upper flange, a core receptacle received partially between said upper and lower flanges and having openings in its bottom receiving the upwardly projecting ends of said tines, arms secured to the ends of said receptacle, said arms extending along the outer sides of the aforesaid legs and having upstanding lugs disposed at opposite sides of the portion of said handle adjacent said legs, and means securing said lugs to this handle portion.

7. A turf fork comprising a one-piece horizontal channel bar having parallel horizontal upper and lower flanges, said lower flange being provided with longitudinally spaced openings, tubular tines secured to said lower flange in axial alinement with said openings, and a handle secured to said upper flange.

8. A turf fork comprising a one-piece horizontal channel bar having parallel horizontal upper and lower flanges, said lower flange being provided with longitudinally spaced openings, tubular tines secured to said lower flange in axial alinement with said openings, and a handle having an arched lower end portion the legs of which are secured to the ends of said upper flange.

EDWARD LEEBERG.